United States Patent [19]

Tuutti

[11] Patent Number: 4,731,120

[45] Date of Patent: Mar. 15, 1988

[54] FILL, COVERING MATERIAL AND EMBEDDING MATERIAL INCORPORATING A HYDRAULIC AND A LATENT-HYDRAULIC BINDER

[75] Inventor: Kyösti Tuutti, Spånga, Sweden

[73] Assignee: Cementa AB, Danderyd, Sweden

[21] Appl. No.: 11,420

[22] Filed: Feb. 3, 1987

Related U.S. Application Data

[63] Continuation of Ser. No. 714,927, Mar. 22, 1985, abandoned.

[30] Foreign Application Priority Data

Mar. 30, 1984 [SE] Sweden .................................. 8401776
Jul. 5, 1984 [SE] Sweden .................................. 8403582
Oct. 25, 1984 [SE] Sweden .................................. 8405344

[51] Int. Cl.$^4$ .................... C04B 18/30; C04B 18/06
[52] U.S. Cl. .......................................... 106/97; 106/88; 106/900; 106/DIG. 1
[58] Field of Search ............. 106/88, 97, 900, DIG. 1

[56] References Cited

U.S. PATENT DOCUMENTS

| | | | |
|---|---|---|---|
| 4,134,774 | 1/1979 | Heese et al. | 106/97 |
| 4,210,457 | 7/1980 | Dodson et al. | 106/97 |
| 4,354,876 | 10/1982 | Webster | 106/97 |
| 4,374,672 | 2/1983 | Funston et al. | 106/97 |

FOREIGN PATENT DOCUMENTS

| | | |
|---|---|---|
| 0022318 | 1/1981 | European Pat. Off. |
| 0050371 | 4/1982 | European Pat. Off. |
| 973075 | 11/1959 | Fed. Rep. of Germany |
| 2131161 | 1/1973 | Fed. Rep. of Germany |
| 2357407 | 7/1975 | Fed. Rep. of Germany |
| 2511109 | 9/1975 | Fed. Rep. of Germany |
| 2608927 | 9/1977 | Fed. Rep. of Germany |
| 2801687 | 7/1979 | Fed. Rep. of Germany |
| 148995 | 10/1983 | Norway |
| 1543562 | 4/1979 | United Kingdom |

*Primary Examiner*—Steven Capella
*Attorney, Agent, or Firm*—Young & Thompson

[57] ABSTRACT

The fill according to the invention comprises a mixture of 1–30% by weight cement with 99–70% by weight of various waste material, fly-ash, de-sulphurization product or granulated blast-furnace slag. The mixture can be used dry or mixed with water, and may also be mixed with air to form small bubbles, thereby rendering the mixture frost resistant. The fill can be used to fill different cavities and pits, such as pipe-laying and cable-laying trenches, floor cavities and holes in streets and roads, and for covering mounds of waste, rubbish dumps and for encapsulating harmful waste. When filling pipe-laying and cable-laying trenches, the intermediate layer of sand, and will thereby prevent water from entering into or leaking from the pipes, while at the same time holding the pipes in position and affording a stabilizing effect against ground movement. The fill hardens to a maximum strength of 10–15 MPa after one or more years, but retains sufficient softness to enable it to be dug-up without difficulty, this hardness becoming a maximum of 10–15 MPa after one or more years.

6 Claims, No Drawings

FILL, COVERING MATERIAL AND EMBEDDING MATERIAL INCORPORATING A HYDRAULIC AND A LATENT-HYDRAULIC BINDER

This application is a continuation of application Ser. No. 714,927, filed Mar. 22, 1985, now abandoned.

Subsequent to digging, for example, a trench in which cables and conduits of different kinds are laid it is necessary on many occasions to fill, or to re-fill, said trench or like excavation. Normally, the trench is filled by shovelling thereinto a fill comprising a soil of some kind or other, possibly after having first placed a special material, such as sand close to the cables and conduits, in order to take-up stresses and for drainage purposes. Although such filling and re-filling of trenches and the like has the advantage of being inexpensive, the results achieved are open to discussion. Due to the inertia of the material mass used, the various voids and cavities do not become filled for quite some considerable time, since the fill does not flow into cracks and cavities to properly fill the same, and the fill is therefore mobile and promotes settlements and, in the worst of cases, shears the conduits and cables. Concrete has been used, but this is too expensive and also difficult to break-up and remove in order to effect any subsequent repair work or work entailing relaying of the cables or conduits. Consequently, one object of the invention is to provide a fill which is capable of filling up the voids and cavities present, which can be pumped into the trench and flow around cables and conduits, which will not settle, which is dimensionally stable and will not contract to any appreciable extent or expand with time, which will harden quickly and is pressure resistant, which can be readily removed even after having been in position for a long time, and which is inexpensive. A further object of the invention is to provide means whereby waste material which is dangerous to the environment can be made harmless. Many such waste materials are dumped on tips, and should be covered with a sealing layer to prevent water from penetrating therethrough. The finer the waste the more susceptible it becomes to water-leaching processes, since the specific surface area of the material increases greatly with fine-grain waste. Consequently, dangerous fill according to the invention is highly suited for this purpose.

Another object of the invention is to use and utilize waste and residual products produced in extremely large quantities and which must be dumped. For example, the combustion of coal and other sulphur-containing fuels creates serious environmental problems with respect to acidification, and consequently it is necessary to cleanse the flue gases of fine dust particles and other deleterious substances. The residual products obtained from such cleansing processes are fly-ash, bottom ash, de-sulphurizing products or combinations thereof. Large quantities of such products are dumped, which results in an additional load on the external environment when the products are in an extremely finely divided form and many poisonous substances can be leached-out therefrom. Other products also dumped are metal-hydroxide sludge, fine industrial waste, blast furnace slag etc., and since many of the residual products are chemically unstable, such products when dumped normally can have serious consequences.

In accordance with the invention it is now possible to mix cement and fly-ash to form a fill exhibiting very good properties. The fly-ash functions as a fine ballast in the hydration of the cement and prevents such cracking as that which would normally occur when using conventional concrete as a fill. Very good results are obtained with a mixture composition of 1–15% by weight cement or lime and 99–85% by weight fly-ash. Water is added to this mixture in an amount to obtain a water binding index WBN, of between 0.30 and 0.60.

$$WBN = \frac{\text{weight water}}{\text{weight cement} + \text{weight fly-ash}}$$

The expression WBN may include all materials having a binding effect, for example slag, de-sulphurizing products, lime, etc.

The consistency of the mixture is controlled by the water binding index, for example in a manner which will enable the mixture to be pumped into cavities which are filled more or less easily, or which will enable the mixture to be shovelled into pits and holes. The mechanical strength of the mixture varies with the amount of cement used and also depends on the water binding index.

Our fill is more suited for filling holes in roads, streets and highways, both in the transverse and longitudinal directions, for filling pipe-laying and cable-laying trenches, as a material for constructing a levelling bed for supporting pipes, conduits etc., for filling floor cavities and wall cavities, and also for use as a covering material for covering mounds of dumped waste, so as to prevent the leaching of poisonous and deleterious substances therefrom.

In addition to the fact that the fill will not settle or undergo changes in volume, it can also be used in all weathers and be readily removed even after having been in place for a long period of time. For example, it can be readily "cut away" with the aid of a mechanical digger, or even with a spade.

The mechanical strength of the fill after one year or more is at maximum 10–15 MPa, depending on the E-modulus of the material. The fill quickly hardens after being laid, and after 18 hours the penetration resistance is so high that a force of 0.3–1.0 MPa results in a maximum deformation of 2–20 mm.

The fill constituents can be mixed in a conventional cement mixer, either industrially for transportation as a pumpable ready-mix fill, or directly on the working site in smaller cement mixers. Another alternative is to place the constituents in a transit or truck mixer, and mix the constituents during transit to the working site.

Particular requirements may be placed on the fill for certain usages. By incorporating a large quantity of minute air bubbles or air pores, the fill becomes less prone to separate and is therewith easier to excavate from deep fills, in addition to which its insulating properties and resistance to frost are greatly enhanced. Density is also reduced and hardening takes place more quickly.

Such a fill is produced by mixing 5–15% by weight cement with 95–85% by weight fly-ash. The fly-ash may be admixed with various other wastes, for example blast furnace slag, while different environmentally harmful waste materials may also be incorporated in the mix, for example such waste materials as metal-hydroxide sludge, poor ash and other waste, such as pyrite etc. which is difficult to dispose of. Fly-ash having a high residual carbon content can also be used, despite the fact that such ash has previously been considered unusable because of its low pozzolanic activity.

The quantities in which the environmentally harmful wastes are incorporated in the fill are determined by the environmental authorities, so that the leaching water does not contaminate the ground water, since a large cement and fly-ash content results in greater denseness or higher degree of impermeability. In the case of the extremely dense mixtures obtained for environmentally harmful waste, it is not intended that the material can be readily dug-up, but that it is sufficiently impervious to prevent damage to the environment.

400–500 l water are added for each m$^3$ of powder mixture. Liquidizing additives may optionally be incorporated in the mixture to render it more liquid and so that it better fills the cavities and voids present. The presence of such liquidizing additives also enables less water to be used. Added to the water is a foaming agent, which reduces the surface tension of the water, so that a large number of air pores are formed. It is important that the air bubbles remain stable sufficiently long enough for the material to harden. A number of different pore-forming agents are available on the market for rendering conventional concrete resistant to frost or for manufacturing aerated concrete. The active constituents of such agents are fatty acids, Vinsol resin, surfactants, lignosulphonate, ether sulphates and amines etc. In the art of concrete technology air contents of 5–7% are sought, while in the manufacture of aerated concrete air contents in excess of 30% are desired. Our invention refers to the use of the combination of a uniform, fine fraction and a moderate admixture of air, 7–20% air to stabilize the fresh properties of the material and to break the capillary pore system to an extent such that material having the character of a sieve can be rendered impervious to water and frost resistant.

An example of a mixture which has been found to give good results in practice is 7% by weight cement and 93% by weight fly-ash, optionally containing blast-furnace slag, environmentally harmful waste, etc.

This is mixed with about 450 l water/m$^3$ containing a foaming agent providing an intended air content of 10–15%. The amount charged is determined with the aid of pre-tests and varies with the material between about 3–15 kg/m$^3$ powder.

When the mixture includes de-sulphurizing products, the amount of water required is considerably less down to 200 l/m$^3$ mixture, and even smaller quantities. The de-sulphurizing products have a form of liquidizing effect.

Because the properties of the fly-ash vary, it is necessary to vary the composition from time to time, with greater or smaller dry solids content, it being possible to judge the most suitable fill consistency as a result of experience. Pressurized air can also be blown into the mass during the mixing procedure. When creating air bubbles in the mixture, there is obtained a material which will not be broken down by frost and which has a mechanical strength capable of being controlled to desired properties, for example, properties which enable the fill to be readily dug-up. The fill will not separate when being laid in a trench or like excavation or while stored between the time of being mixed and of being laid, and is therefore particularly suitable for use as a re-filling mass. The fill hardens quickly, but can nevertheless be readily dug-up after hardening. A total volume of air bubbles of between 5–20% has been found to give the best results. If the admixed waste materials contain other activators, such as lime, a correspondingly smaller amount of cement should be used. Thus, when admixing de-sulphurizing material containing high percentages of lime, the amount of cement used is reduced to 1–2% by weight in the powder mixture.

When filling pipe or cable trenches there is at present used sand which is placed around and above the pipes, whereafter the trench is filled with coarse material. The sand serves as a drainage means, and both water leaking from pipes and pipe joints, together with ground water, flows in an uncontrolled manner in the sand. When the fill according to the present invention is used instead of sand and placed around the pipe in the bottom of the trench, the pipe is held fixed in position and seals the pipe in a manner which renders it difficult for water to enter the pipe or leak therefrom. In addition hereto, the fill functions as a supporting beam which stabilizes against settling of the soil and displacements therein. The fill is laid in the trench, simply by tipping the fill in the form of a loose slurry into the trench, or pumping the fill thereinto, to the desired level, without it being necessary to compact the fill.

The aforementioned de-sulphurizing product comprises mainly a plurality of different calcium salts and minor quantities of different compounds of trace substances. The composition is directly dependent on the coal combusted. The de-sulphurizing product can be produced in various ways, for example by a wet-dry de-sulphurizing process, in which a lime solution is sprayed into the flue gas, to produce a dry residual product. In this respect, the major part of the fly-ash can either be separated prior to the de-sulphurizing process, or may accompany the process and be mixed with the de-sulphurizing product. A characteristic composition of de-sulphurizing products is given in Table 1 below.

TABLE 1

| Chemical Compound | Percent by Weight |
|---|---|
| $CaSO_3.12H_2O$ | 50–80 |
| $CaSO_4.2H_2O$ | 5–20 |
| $CaCl_2.2H_2O$ | 1–10 |
| $Ca(OH)_2$ | 5–20 |
| $CaCO_3$ | 5–15 |

The de-sulphurizing product can be flocculated around fly-ash particles in fine-powder form having a particle size of 2–5 m. In the absence of fly-ash, the de-sulphurizing products are agglomerated to composite agglomerates of very high porosity.

The problem encountered with the de-sulphurizing product is associated with the stability of the calcium sulphite and the question of whether a chemically unstable residual product can be used directly, whether oxidation can be prevented or whether the material must be oxidized prior to being used. Even though oxidation of the material has given good results, an oxidizing plant is highly expensive and consequently the direct use of the product of de-sulphurization to be preferred. This can be effected in the fill and has been found to give a very good result, particularly when the fill is used as a covering material. The de-sulphurizing material is able, in itself, to activate the glass phase in granulated blast-furnace slag and in fly-ash. The growth in the strength in the material is controlled by adding Portland-cement even though the mechanical strength of the material is not the parameter of most interest, since the material is not in a chemically stable phase. Even though an excessive content of Portland-cement results in an unacceptable swelling reaction, the cement is a suitable activator since the material obtains thereby an internal basic environment which greatly impedes oxidation of the unstable sulphite. The strength values of the mixture are also sufficiently high to noticeably impede the diffusion of oxygen into the material.

The readily dissolved salts contained in the product of de-sulphurization promote the uptake of water and reduce the resistance to frost activity, and one condition for the successful use of the material is consequently that the matrix is sealed with another, stronger binder or that there is created a system of air pores which provides the requisite degree of swelling. A mixture of cement, de-sulphurizing product, fly-ash and slag is particularly suited for encasing dangerous operational waste. Impervious covers for less dangerous tips can also be formed from this mixture. Layers of clay and sand-bentonite-mixtures are at present used for this purpose, although concrete is avoided due to the risk of cracks forming therein Particularly good properties have been obtained, by adapting the quantities in which the various constituents are present in the mixture in accordance with the invention. If the product of de-sulphurization is used in excessive quantities, the material becomes sensitive to water and there is a risk of a swelling reaction if the sulphite converts to sulphate. The use of an excessive quantity of cement also results in a swelling problem, due to the formation of ettringite, and the maximum permissable sulphure trioxide content of cement is 4%. The harmful effects of our mixture, however, are restricted by the fact that the cement content is so low that the ettringite formed will not swell to an extent which causes ruptures in the material. A suitable composition of our fill for ground binding purposes is a cement content of 2-30% by weight, a quantity of 10-40% by weight de-sulphurization product, and the remainder comprising a puzzolanic material which reacts upon contact with a given substance, for example a high percentage of OH-ions, and which can be sulphate activated. The puzzolanic material may be fly-ash or granulated blast-furnace slag. Thus, a sealing mass according to the invention can be produced by mixing 60-90% by weight fly-ash with 10-40% by weight de-sulphurization product, and 80-98% by weight of this mixture admixed with 2-20% by weight Portland-cement.

A mound of garbage, domestic waste, coal ash or similar less harmful material can be covered with a layer of some material which can be sulphate activated or reacted with cement-solution extract, i.e. a high OH-ion content, such as a material having a pH of 12-14. Such materials include fly-ash and granulated blast-furnace slag which can be laid out wet, and various mixtures which must be laid out in a dry state, such as a mixture of fly-ash and de-sulphurization product, a mixture of de-sulphurization product and granulated blast-furnace slag or fly-ash mixed with both slag and de-sulphurization product. This material must not be allowed to react before providing an externally lying layer. This outer, hard layer contains cement in quantities such as to provide a basic reserve which can be leached out, for example all types of concrete, fill with more than 10% by weight cement and the mixture according to the invention of fly-ash and/or granulated blast-furnace slag which has been activated with de-sulphurization product and cement. The mound is covered with a top layer of soil or the like, which serves as a substrate for plant life, grass, shrubs and eventually trees.

When the mound of waste settles no caving will take place, but the hard external shell will crack and remain on the inner powdery material in larger or smaller pieces. The hard material forming the shell is of a nature which enables it to crack relatively easily and to fall together as soon as there is a tendency to caving. The underlying powder layer must also be of a thickness such that when the mound settles there is continuously formed a coherent layer without interruption, this thickness in practice being at least about 1 m. When cracks have formed, rain water will progressively enter through the cracks and activate the underlying powder material, causing the same to harden. During passage of the water over the hard layer and through the cracks, OH-ions are also leached out, therewith to raise the pH of the rain water so as to additionally activate hardening of the powder material. Normally, all cracks are closed after 2-3 months.

Waste which is liable to be harmful to the surrounding environment if water passes through the material, can be dumped more safely if it is mixed with our aforementioned binder and compounded to a homogenous, dense foundation. The density of the mixture is controlled with the aid of conventional proportioning techniques.

When using a fill for sealing-off waste material, the maximum permitted permeability is $10^{-8}$ m/s. It is possible by proportioning, however, to proportion our material to a permeability of $10^{-11}$–$10^{-12}$ m/s, i.e. a permeability corresponding to or lower than a mixture of sand and bentonite. By sealing off the waste material in this way it is also possible to prevent gases from escaping and polluting the surroundings. Another aspect is that the moisture ratio can be controlled when desiring to use the departing gases as fuel. The generation of gases can be controlled irrespective of rain, and the gas can be reserved until a suitable moment in time, by adding water through the sealing layer when there is a need for heat, for example in the winter.

The filling materials according to the invention can thus be put to many diferent forms of use, and the invention offers an important service by proposing valuable usage of waste products which previously have only presented a dumping problem.

I claim:

1. A fill and ground-binding agent for filling and re-filling cavities and holes, such as pipe and cable laying trenches, floor cavities and holes in streets, roads, etc., and for covering waste mounds, rubbish tips and other less harmful material, or for totally encapsulating dangerous waste material, characterized in that it contains 2-30% by weight cement and 10-40% by weight de-sulphurization product, balance essentially at least one member selected from the group consisting of fly-ash and granulated blast-furnace slag in mixture with water, and at least 5% by volume air.

2. A fill according to claim 1, in which said air is 5-25% by volume.

3. A fill according to claim 1, in which said air is 10-15% by volume.

4. A fill according to claim 1, whose mechanical strength is 10-15 MPa.

5. A fill according to claim 1, in which said cement is present in an amount 3-7% by weight.

6. A fill according to claim 1, in which said de-sulphurization product consists essentially of the following:

| Chemical Compound | Percent by Weight |
|---|---|
| $CaSO_3.1/2H_2O$ | 50-80 |
| $CaSO_4.2H_2O$ | 5-20 |

-continued

| Chemical Compound | Percent by Weight |
|---|---|
| $CaCl_2.2H_2O$ | 1-10 |
| $Ca(OH)_2$ | 5-20 |
| $CaCO_3$ | 5-15. |

* * * * *